UNITED STATES PATENT OFFICE.

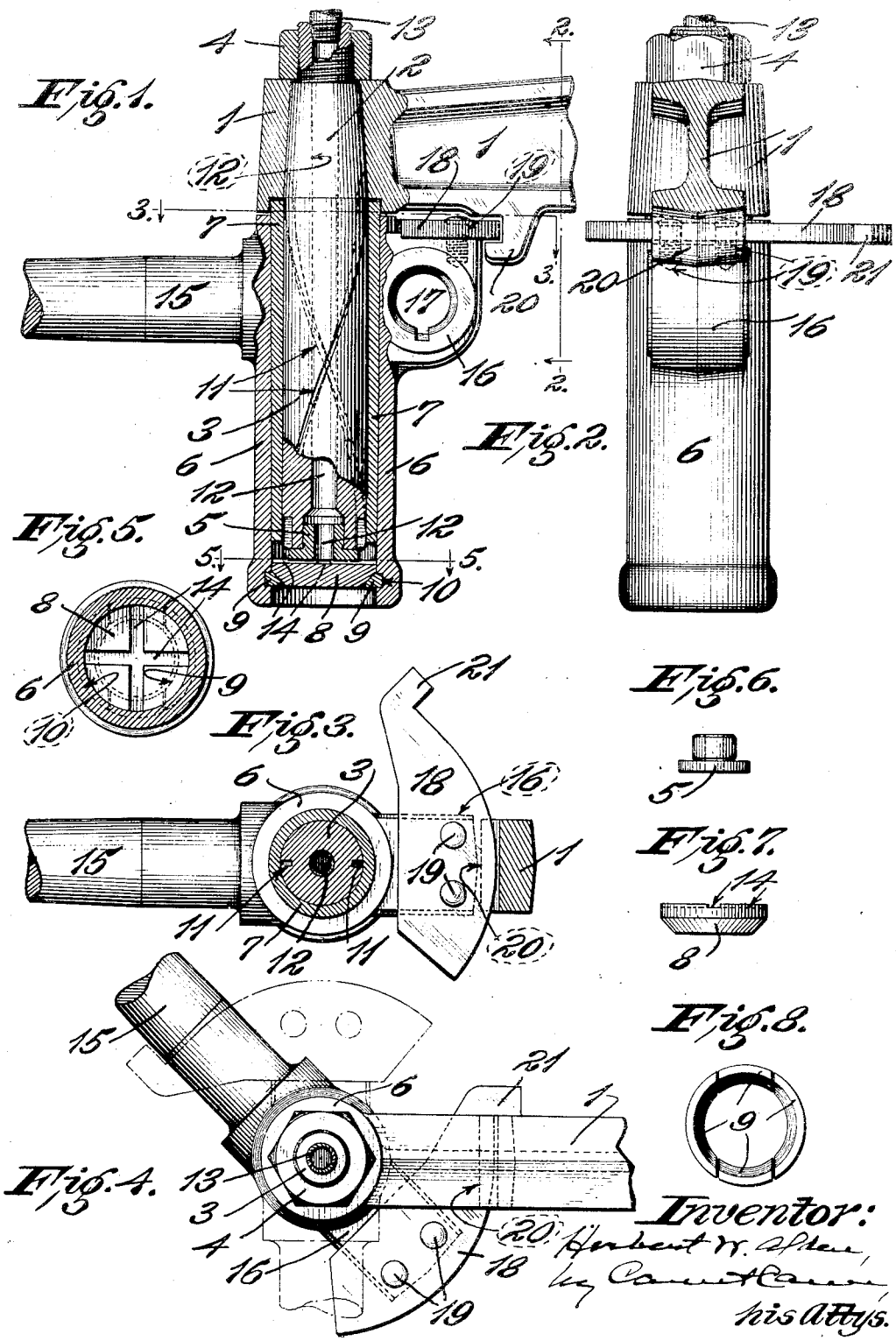

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

STEERING-KNUCKLE.

1,371,594.      Specification of Letters Patent.      Patented Mar. 15, 1921.

Application filed September 15, 1919. Serial No. 323,832.

*To all whom it may concern:*

Be it known that I, HERBERT W. ALDEN, a citizen of the United States, and a resident of the city of Detroit, in the county of Wayne and State of Michigan, have invented a new and useful Improvement in Steering-Knuckles, of which the following is a specification.

My invention relates to steering knuckles for motor vehicles and has for its objects to provide for simplicity and cheapness of construction of such devices, to localize the wear on inexpensive parts, to facilitate replacement of worn parts, to provide for lubrication, and to obtain other advantages.

The invention consists in the parts and combinations of parts hereinafter described and claimed.

In the drawings, which form part of this specification and wherein like numerals indicate like parts in the several views, Figure 1 is an elevation, partly in section, of a steering knuckle construction embodying my invention;

Fig. 2 is a view partly in section;

Fig. 3 is a section along the line 3—3 in Fig. 1;

Fig. 4 is a top plan view;

Fig. 5 is a section along the line 5—5 showing a plan view of the thrust member;

Fig. 6 is a view of a bearing head for the end of the knuckle pin;

Fig. 7 is an elevation of the thrust member; and

Fig. 8 is a plan view of the sectional bearing ring, which secures the thrust member in position.

The drawings show only one end of an axle, but it will be understood that the construction of the other end is like that shown.

Near its end, the axle 1 has a vertical hole which is tapered to fit the tapered upper end portion 2 of a cylindrical knuckle pin 3. The upper end of the knuckle pin 3 projects above the axle 1 and is threaded and provided with a nut 4, which bears against the upper surface of the axle and is adapted to pull the tapered surface of the pin up against the tapered portion of the vertical bore or hole in the axle. The lower end of said knuckle pin is counterbored to receive the shank of a hardened bearing head 5.

The cylindrical body portion of the steering knuckle pin is inclosed by a hollow steering knuckle 6. The bore of the steering knuckle is tapered and has a metal bushing 7 therein, whose inner surface is cylindrical to form a journal bearing for the knuckle pin and whose outer surface is tapered to fit the bore of the steering knuckle. This bearing head on the lower end of the knuckle pin bears on and is supported by a disk 8, which is held in place in the steering knuckle by means of a sectional ring 9 mounted in an annular groove 10 in the bore of the steering knuckle, and which relieves the knuckle pin of the load which its tapered upper end portion receives from the axle. The under side of the disk and the inner surface of the ring are beveled. The load seats the disk more firmly in the ring and presses the ring into its groove. The ring is preferably made in four pieces, as shown in Fig. 8, so that it can be inserted easily in the groove and removed therefrom. A convenient method of making such sectional ring is to start with a rigid integral ring of proper shape and size to fit the groove and cut parallel chordal slots therein and then shatter the ring along said slots by a sharp blow with a hammer. The divisions must be such that the chord of the outer surface of each section is less than the diameter of the bore of the steering knuckle and the chord of the last section to be inserted is not greater than the inner chord of the space into which said section is placed. A resilient split ring might be used, but it could not be easily removed.

The steering knuckle pin has helical oil grooves 11 in its outer surface. An oil passageway 12 extends through the knuckle pin and bearing head. The upper end portion of the wall of the passageway 12 is threaded to receive the threaded end of a tube 13, which leads to a grease cup, or an oil line or other source of lubricant supply. The disk 8 has oil grooves 14 across its upper face. The intersection of these grooves communicates with the oil passageway 12 in the steering knuckle pin. The joint between the disk and the bore of the steering knuckle is oil tight.

The steering knuckle has a horizontal spindle 15 projecting therefrom on which the vehicle wheel is mounted. A boss 16 on said steering knuckle has a hole 17 therethrough provided with a keyway. A rod (not shown) is keyed in this hole and connected to the steering mechanism.

The steering knuckle is provided with a limit stop preferably in the form of an arcuate plate 18 located in proximity to the underside of the axle and secured to the boss by bolts or screws 19, the outer portion 21 of said plate being adapted to bring up against the axle at the limit of its angular movement. For this purpose, the outer end of said plate may be extended horizontally so as to bear against a downwardly projecting portion 20 of the axle, as illustrated in the drawings, or said outer end may be turned up in position to bear against the face of the axle. Underneath the plate 18, but normally clear thereof, is a member that extends from the body of the axle. In the construction illustrated, this projecting member is a lug 20 formed on the underside of the axle and provided with a horizontal flange that projects toward the end of the axle and is spaced far enough from the body of the axle to provide a recess to accommodate said plate 18. The plate 18 rotates in the recess when the steering knuckle is rotated, but no steering angle is large enough to cause the plate to leave the recess and disengage the steering knuckle.

When the steering rod is disconnected, the steering knuckle can be turned far enough to cause the locking plate to clear the axle, (as is shown in the dot and dash lines in Fig. 4) and then the knuckle pin can be disengaged from the knuckle by jacking up the axle.

The construction shown is capable of withstanding hard usage and is adapted for use in heavy vehicles. It is capable of carrying heavy loads; it is easily assembled and dismantled and all of the parts subject to wear can be replaced separately and conveniently.

It is evident that numerous changes may be made without departing from my invention and I do not wish to be limited to the precise construction shown and described.

What I claim is:

1. The combination with an axle having an upwardly tapering hole therein, of a knuckle pin having a tapered upper portion adapted to fit into said hole and a threaded upper end portion projecting above said axle, a nut on said threaded portion and a hollow steering knuckle adapted to receive said knuckle pin, said knuckle having a hardened disk removably mounted therein to constitute a bearing for the end of said pin.

2. The combination with an axle having an upwardly tapering hole in the end portion, of a knuckle pin extending downwardly from said axle and having a tapered upper end portion adapted to fit in said hole, and a hollow steering knuckle adapted to receive said knuckle pin, said knuckle having a radially grooved end bearing disk for said knuckle pin and said knuckle pin having a passageway extending longitudinally through it for lubricating said end bearing.

3. A hollow knuckle having an annular groove in the bore thereof, a sectional ring in said groove, a thrust member seated on said ring, and a knuckle pin in said knuckle.

4. A hollow knuckle having an annular groove in the bore thereof, a ring in said groove, said ring having its upper inside edge beveled and comprising a plurality of segments whereby said ring is adapted for easy insertion in and removal from said groove, a thrust member having a conical lower portion seated on said ring, and a knuckle pin in said knuckle.

Signed at Detroit, Michigan, this 10th day of September, 1919.

HERBERT W. ALDEN.